United States Patent [19]

Stevens

[11] Patent Number: 5,494,388
[45] Date of Patent: Feb. 27, 1996

[54] HIDDEN ADJUSTABLE TIE-DOWN DEVICE

[76] Inventor: Gary Stevens, 3310 Harrison Ave., Centralia, Wash. 98531

[21] Appl. No.: 185,263

[22] Filed: Jan. 24, 1994

[51] Int. Cl.$^6$ ........................................ B60P 7/08
[52] U.S. Cl. .................... 410/112; 410/96; 410/101; 410/104; 403/395; 403/399
[58] Field of Search ................. 410/96, 97, 98, 410/100, 101, 102, 104, 106, 108, 109, 110, 112, 113, 115; 403/22, 399, 398, 395, 397, 7, 87, 88, 89, 110, 118; 24/279, 20 LS, 115 K, 265 CD; 296/40; 248/499, 307, 215, 214

[56] References Cited

U.S. PATENT DOCUMENTS

| | | | |
|---|---|---|---|
| 1,404,029 | 1/1922 | Kapp | 248/215 |
| 2,280,694 | 4/1942 | Embree et al. | 24/115 K |
| 2,470,878 | 5/1949 | Tate | 248/215 X |
| 2,863,203 | 12/1958 | Dalpiaz | 24/279 |
| 3,428,282 | 2/1969 | Pernice | 410/110 |
| 4,078,636 | 3/1978 | Yamanaka | 410/87 X |
| 4,396,324 | 8/1983 | Ellis | 410/104 X |
| 4,507,033 | 3/1985 | Boyd | 410/104 |
| 4,850,769 | 7/1989 | Matthews | 410/110 X |
| 4,906,040 | 3/1990 | Edwards | 24/297 X |
| 4,944,683 | 7/1990 | Leonando | 24/279 X |
| 4,969,784 | 11/1990 | Yanko | 410/104 |

*Primary Examiner*—Michael S. Huppert
*Assistant Examiner*—Stephen Gordon
*Attorney, Agent, or Firm*—T. Secrest

[57] ABSTRACT

This invention is directed to a tie-down device for use with small trucks such as pickup trucks having sides. The sides comprise an exterior wall and an interior wall. There is positioned between the exterior wall and the interior wall an elongated member such as a rod or a tube. There is positioned on the elongated member a clamp having an eye bolt. A cargo box or cargo may be positioned on the bed of the pickup truck. A stretchable elastic tie-down device having a hook on each end may be stretched over the cargo box and attached to the eye bolt on one side of the pickup truck and to an eye bolt on the other side of the pickup truck to hold the cargo box in position.

10 Claims, 5 Drawing Sheets

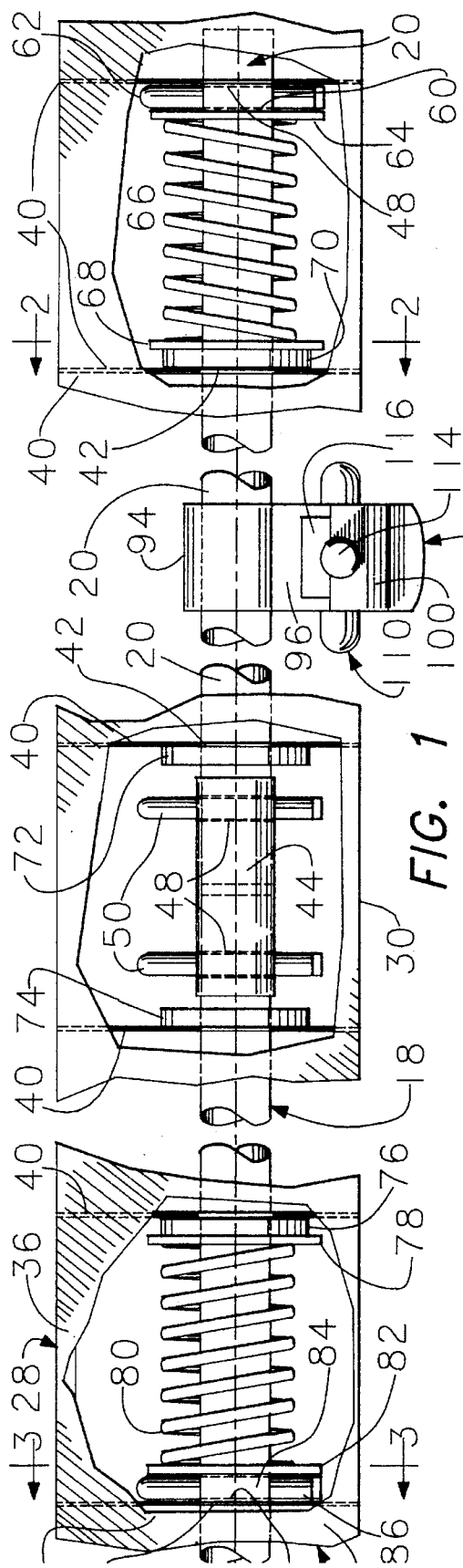

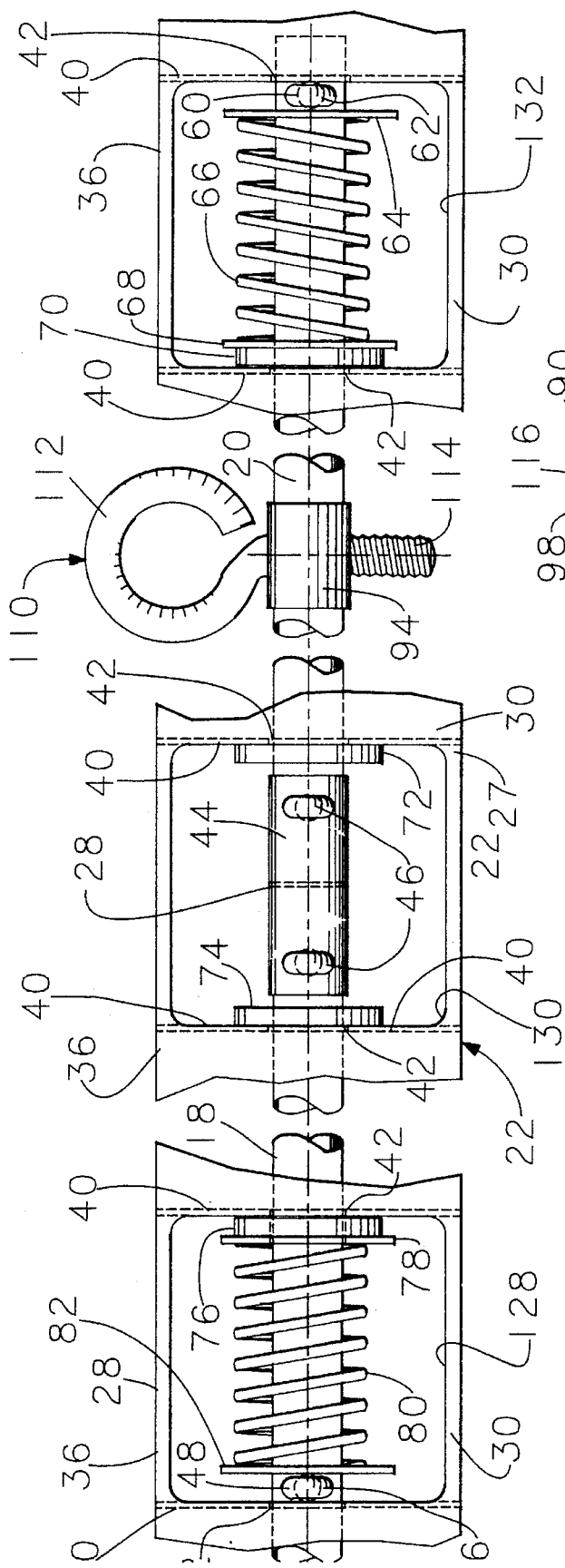
FIG. 5
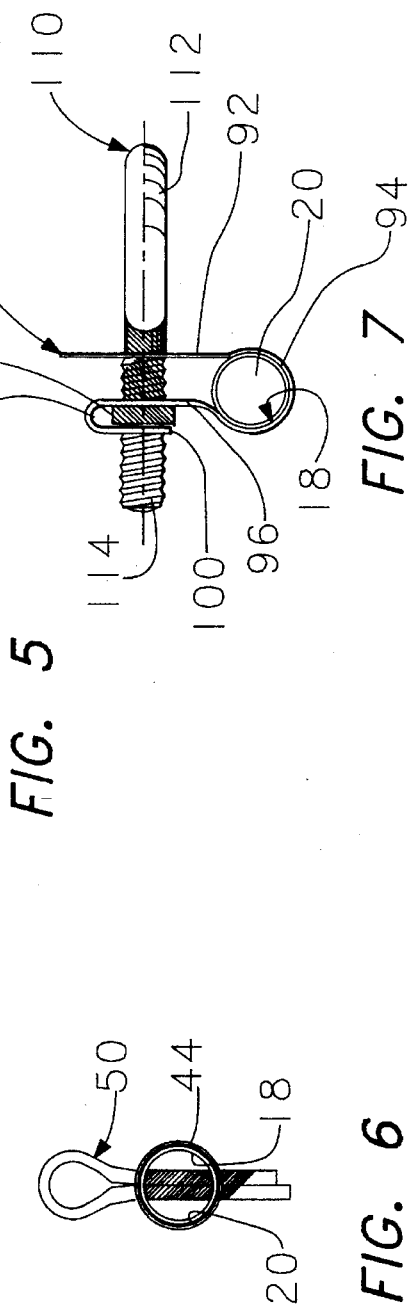
FIG. 7
FIG. 6

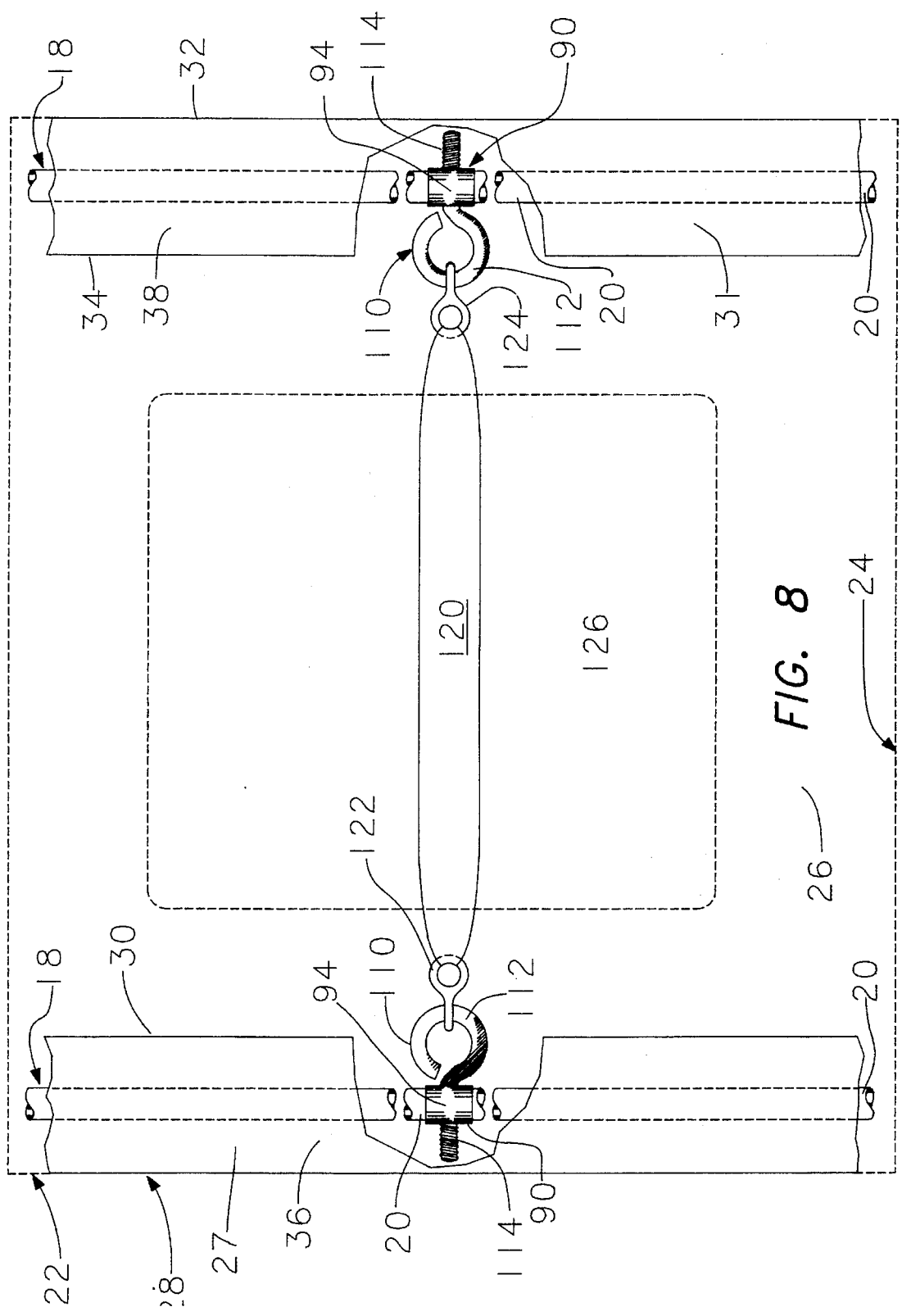

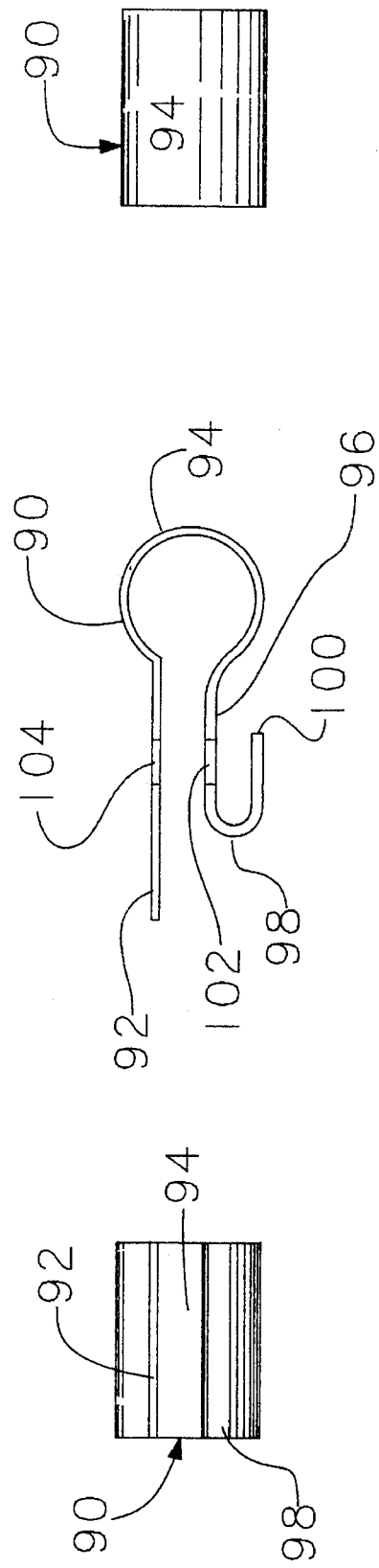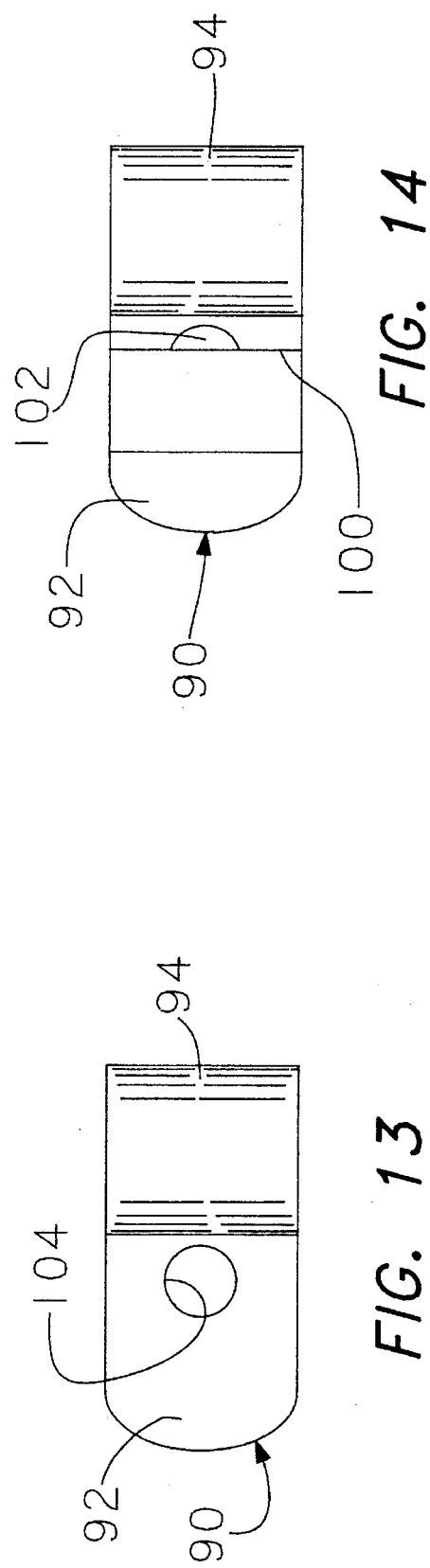

HIDDEN ADJUSTABLE TIE-DOWN DEVICE

THE BACKGROUND OF THE INVENTION

Small trucks, such as pickup trucks, quite often have a cargo bed for hauling various types of cargo. Many times, it is desirable to be able to firmly and definitely position the cargo in the cargo bed. Over the years, there have been invented a number of devices for holding a rope or a resilient tie-down means over the cargo in the cargo bed.

A cargo bed will have four sides or two short sides and two long sides. Generally, one of the short sides is a rotatable gate at the end or open end of the cargo bed. One long side meets with a short side which in turn meets with a long side. The two long sides are parallel.

The sides extend upwardly from the floor or bed or the cargo bed.

The two long sides and the connecting short side are, generally, made of sheet metal and are rolled over and directed inwardly at the upper part. Then, the inwardly directed part is directed downwardly so as to be spaced apart and parallel with the long sides and the short sides.

Quite often, in the inwardly directed part, there are two or three recesses and are called stake-pockets.

One invention comprises a part that can be inserted into a stake pocket and then expanded so it can firmly be positioned in the stake pocket. This is a tie-down device. There may be three on each long side, one at each end and one in the middle. This type of tie-down device has an eye hook or an eye. It is possible to run a rope or stretchable cable or stretchable member from these tie-down devices to definitely and firmly position the cargo in the cargo bed. For example, a trunk or a storage box or the like may be in the cargo bed. The rope or stretchable and flexible tie-down unit may be positioned over the cargo box or trunk to firmly hold it in position.

Another tie-down device is on the outside of the long side. There is positioned a number of attachments for holding a rope or flexible stretchable tie-down member. The cargo, such as a trunk or storage unit, can be placed in the cargo bed and then the rope runs around these exterior tie-down devices and over the trunk or cargo box so as to definitely position the trunk or the cargo box in the cargo bed. Further, at times it may be desirable to have a tarp placed over the cargo bed. This tarp can be attached to these exterior tie-down devices.

Further, it is often desirable to form racks so as to hold in a material such as firewood or small animals such as calves and sheep. The racks will comprise a vertical member such as can be positioned in the stake pocket. Then, parallel members can be run inside the vertical members so as to form racks.

I have used devices for holding cargo in a cargo bed of my pickup truck. From having used these devices, the subject matter of this invention occurred to me.

A GENERAL DESCRIPTION OF THE INVENTION

This invention is directed to a tie-down device which is generally hidden from view. On the long sides of the cargo bed, and between the exterior wall and the interior wall and underneath the inwardly directed part, I have devised a tie-down device which can be positioned in this area. There is one on each side of the cargo bed, and it can be used for receiving a rope or flexible resilient strap for holding cargo in the cargo bed.

This invention comprises two spaced-apart elongated members, one on each side of the cargo bed, and which members are definitely positioned lengthwise in the cargo bed.

OBJECTS AND ADVANTAGES

One of the objects and the advantages of this invention is a new and innovative tie-down device for use in the cargo bed of a truck;

Another object and advantage is a low-cost tie-down device;

Another further object and advantage is the provision of such a low cost tie-down device which can be made from low-cost and readily available materials;

A further object and advantage is such a tie-down device which is easy to install in the cargo bed of a truck; and, A low cost tie-down device which is generally hidden from view and does not detract from the appearance of the truck.

THE DRAWINGS

In the drawings it is seen that

FIG. 1 is a fragmentary top-plan view of the tie-down device illustrating the elongated member, tensioning springs, clamp and eye hook, and in the cargo bed of a truck and inside of the side;

FIG. 2 is a fragmentary, lateral, cross-sectional view taken on line 2—2 of FIG. 1 and showing the elongated member and a washer to assist in positioning the elongated member;

FIG. 3 is a fragmentary, lateral, cross-sectional view taken on line 3—3 of FIG. 1 and illustrating the elongated member, a cotter key and a washer to assist in positioning the elongated member;

FIG. 4 is a fragmentary view taken on line 4—4 of FIG. 1 and illustrating the elongated member, the clamp, and an eye bolt;

FIG. 5 is a side-elevational fragmentary view illustrating the elongated member, the tensioning springs and washers, the clamp on the elongated member, and an eye bolt on the clamp in the cargo bed of a truck;

FIG. 6 is lateral cross-sectional view of the elongated member and a cotter key to assist in positioning the elongated member;

FIG. 7 is a view of the elongated member, the clamp for being positioned on the elongated member, and an eye bolt;

FIG. 8 is a schematic top-plan view showing two spaced-apart elongated members, each with a clamp and an eye bolt, in the cargo bed of the truck, a cargo box, and a flexible resilient member for connecting with each eye bolt for holding the cargo box in position in the cargo bed and inside of the side;

FIG. 10 is an elevational view looking at the open end of the adjustable clamp;

FIG. 11 is a side-elevational view of the adjustable clamp;

FIG. 12 is a closed-end view of the adjustable clamp;

FIG. 13 is a top-plan view of the adjustable clamp; and,

FIG. 14 is a bottom-plan view of the adjustable clamp.

THE SPECIFIC DESCRIPTION OF THE INVENTION

Figure 9:
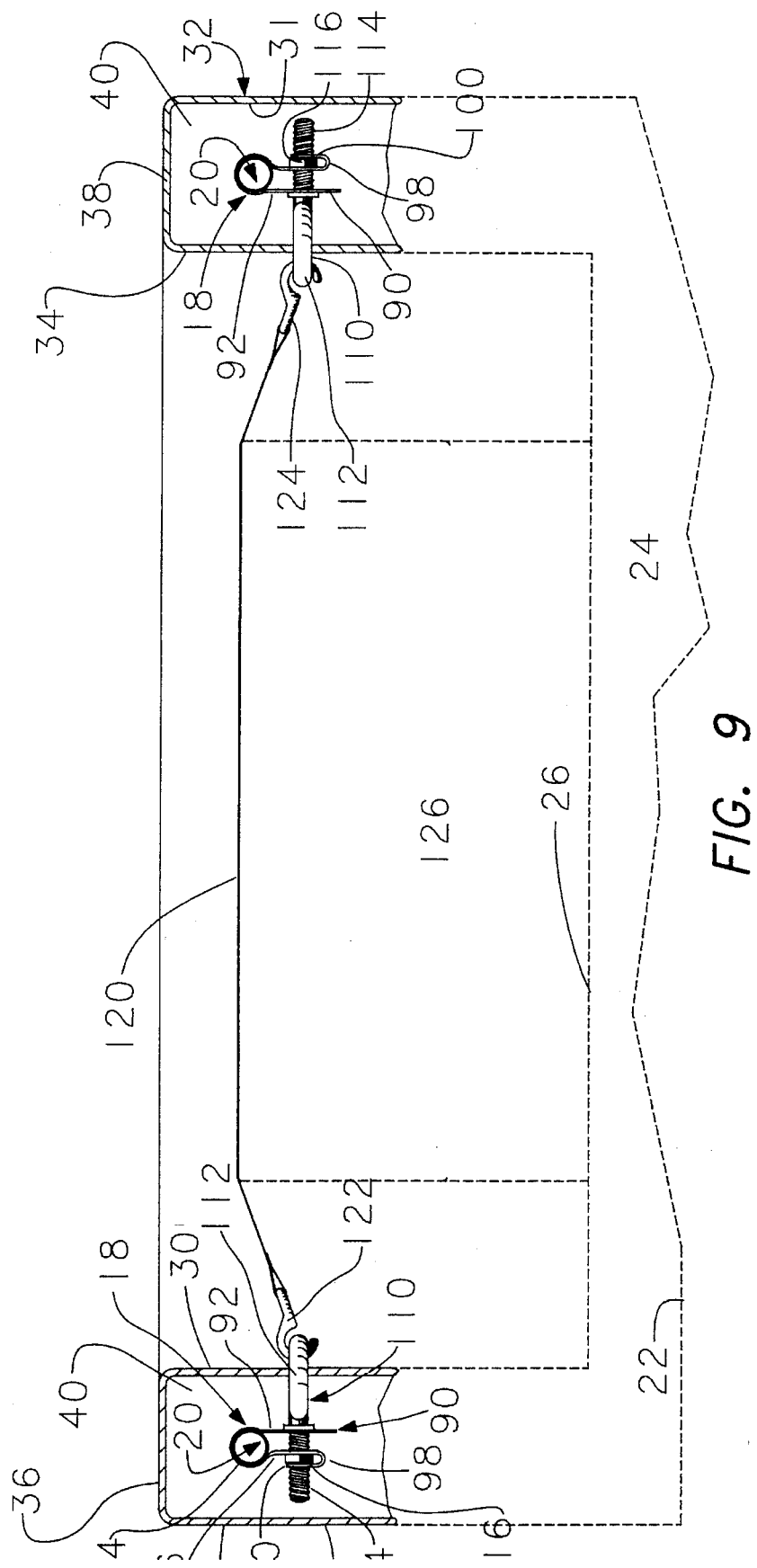
FIG. 9 is a fragmentary end-elevational view of the truck showing the cargo bed, the two spaced-apart long sides, and an elongated member in each spaced-apart long side, a clamp on each elongated member and an eye hook in each clamp, a cargo box in a cargo bed, and a flexible stretchable tie-down strap connecting on each end with one of the eye bolts for positioning the cargo box in the cargo bed.

In the drawings, it is seen that the tie-down device 18, comprising an elongated member 20, is positioned in a truck 22 having a cargo bed 24. The cargo bed 24 has a floor 26.

There are two spaced-apart long sides, a left side 27 and a right side 31. The left side 27 and the right side 31 are parallel and run the length of the cargo bed 24.

The left side 27 comprises an exterior left wall 28 which bends inwardly to form an upper top panel 36. The upper top panel 36 bends downwardly into an inner wall 30. The inner wall 30 is inwardly spaced apart from the exterior left wall 28.

The right side 31 comprises an exterior right wall 32 which on its upper part bends inwardly to form an upper top panel 38. Upper top panel 38 bends downwardly to form an interior wall 34. The interior wall 34 is inwardly spaced apart from and is parallel to the right wall 32.

The elongated member 20 may be a rod or a tube. I have used a tube 20 having a circular cross section. The tube 20 is satisfactory and has sufficient strength to function in the tie-down device 18.

In FIGS. 1 and 5, it is seen that between the inner wall 30 and the exterior wall 28 and, between the inner wall 34 and the exterior wall 32, that there is positioned a plurality of reinforcing spacers or reinforcing plates 40. These plates 40 add rigidity and strength to the structure of the left side 27 and also to the structure of the right side 31 of the long sides of the cargo bed 24.

In each of the reinforcing plates 40, there is a passageway 41. The passageways 41 in the plates 40 are designed for receiving the elongated member 20. The interior diameter or dimensions of the passageways 41 are greater than the exterior dimensions or exterior diameter of the elongated member 20 so that the elongated member 20 can be moved or positioned in these passageways 41.

In FIGS. 1 and 5, it is seen that there are two elongated members 20 joined by a splicer sleeve 44. The reader is to understand that the elongated member 20 may be sufficiently long that it is not necessary to employ a splicer sleeve 44. The internal dimensions of the splicer sleeve 44 are larger than the external diameter of the elongated member 20. This makes it possible for the splicer sleeve 44 to readily slip over the elongated members 20.

In the splicer sleeve 44, see FIG. 5, there are, near each end, two aligned passageways 46 making a total of four passageways 46.

Also, in the elongated member 20, and near each end, are two passageways 48, making a total of four passageways 48. The passageways 48 are aligned.

A cotter key 50, having a short leg 52, a loop 54 which extends into a long leg 56 positioned next to the short leg 52, is positioned in one set of passageways 46 and 48 and in another set of passageways 46 and 48. This produces one long elongated member 20.

The reader is again reminded that in place of two elongated members 20 in an end to end relationship and connected by splicer sleeve 44 it is possible to have one long elongated member 20 which eliminates the need for a splicer sleeve 44 and cotter keys 50.

The elongated member 20 can be positioned in the passageways 41 in the reinforcing plates 40. In FIG. 1, it is seen that in the elongated member 20 there is a passageway 60 near the right end. A cotter key 62 is placed in this passageway. Then, a washer 64 having a central passageway having a larger internal diameter than the external diameter of the member 20 is positioned over the member 20. Then, a spring 66, having a larger internal dimension than the external dimension of the member 20, is positioned over the member 20. Then, a washer 68 having a central passageway with an internal dimension larger than the external dimension of the member 20, is placed over the member 20 and is pressed against the spring 66. A hose gasket 70, which may be rubber or plastic, and is resilient and having a passageway with larger internal dimensions than the external dimensions of the member 20, is positioned next to the washer 68 so as to act as a buffer between the washer 68 and the reinforcing plate 40. The above can be accomplished by having a washer 68, a spring 66, and a washer 64 compressed against the plate 40 to leave space for inserting the cotter key 62 into the passageway 60.

The hose gasket 70 is resilient and adds a cushioning effect so as to stop movement and to stop rattling between the rod 20 and the reinforcing plates 40.

There is a gasket 72 or a washer 72 which is close to the splicer sleeve 44 and bears against the reinforcing plate 40.

To the left of the gasket 72, there is a gasket 74 or a washer 74 to the left of the splicer sleeve 44. The gasket 74 bears against the reinforcing plate 40.

The gaskets 72 and 74 have central passageways with internal dimensions greater than the external dimensions of the elongated member 20 so that the gaskets can slip over the member 20.

At the left it is seen that there is a gasket or a washer 76 of resilient material for bearing against the plate 40. To the left of the gasket 76 there is a washer 78.

To the left of the washer 78 there is a spring 80. To the left of the spring 80 there is a washer 82.

In the elongated member 20, there are two passageways 84 for receiving a cotter key 86. The spring 80 pushes the gasket 76 against the plate 40 and pushes the cotter key 86 against the plate 40.

The gasket 76, washer 78, spring 80 and washer 82 have internal dimensions greater than the external dimensions of the rod 20 so that they can slip over the rod 20.

The gaskets 70, 72, 74, and 76 are of resilient material and the springs 66 and 80 along with the cotter keys 62 and 86 definitely position the rod 20 between the walls 28 and 30, and between the walls 32 and 34.

There is a clamp 90, of unitary construction, comprising a long leg 92 which bends into loop 94. The loop 94 then bends into a short leg 96 which is spaced apart from the long leg 92 and is substantially parallel with the long leg 92. The short leg 96 bends into a curve 98 which terminates in an end 100. The end 100 is spaced apart from the short leg 96 and is substantially parallel to the short leg 96.

The internal dimensions of the loop 94 are greater than the external dimensions of the rod 20.

In the long leg 92, there is a passageway 104.

In the short leg 96, there is a passageway 102.

The passageways of 104 and 102 are aligned.

The loop 94 can be slipped over the rod 20 and positioned where desired, see FIGS. 1 and 5.

There is an eye bolt 110 comprising a loop or a curved portion 112 which extends into a threaded shank 114.

The external dimensions of the threaded shank 114 are less than the internal dimensions of the passageways 104 and 102.

As is illustrated in FIG. 7, the eye bolt 110 can be positioned with the threaded shank in the passageways 104 and 102. A nut 116 is threaded onto the threaded shank 114. The nut is positioned between the end 100 and the short leg 96 of the clamp 90. By turning the eye bolt 110, the nut 116 moves on the threaded shank 114 so as to force together the long leg 92 and the short leg 96 to tighten and to definitely position the loop 94 on the rod 20. In this manner, the clamp 90 is definitely and firmly positioned on the rod 20 at a desired position.

The reader is to remember that on the left side 27 and in the inner wall 30 there are a plurality of openings 128, 130, and 132. These openings make it possible to position the rod 20 between the inner wall 30 and the exterior wall 28 and underneath the top panel 36. Also, these openings make it possible to position the clamp 90 on the rod at one or more positions.

The reader is to realize that in the right side 31 of the pickup bed there are similar openings 128, 130, and 132 for positioning the rod between the right exterior wall 32, the interior wall 34 and underneath the upper top panel 38. Also, these openings make it possible to position the clamp 90 on the rod 20 in the right side of the pickup bed.

There may be positioned a cargo box 126 on the floor 26 of the truck, see FIGS. 8 and 9.

Then there may be stretched a flexible tie-down strap 120 having on the left end a hook 122 which attaches to the eye bolt 110. On the right end, there is a hook 124 which attaches to the eye bolt 110. This flexible strap stretches between the inner walls of the bed of the truck and holds down the cargo box. In certain instances, it may be desirable to have two spaced-apart flexible straps 120 for holding down the cargo box.

The cargo box 126 may represent many forms of cargo. The cargo box 126 may take the form of hay bales, bundles of shakes, or bundles of palettes, to name a few items.

In the foregoing, it is seen that I have provided a tie-down device 18 comprising readily available inexpensive commercial components.

Also, this tie-down device is generally hidden from view so as not to detract from the appearance of the truck.

RESUME

The subject matter is a tie-down device for use on a small truck such as a pickup truck having a left side 27 and a right side 31. Side 27 is used for illustrative purposes. Side 27 comprises an exterior wall 28 and interior wall 30 joined by a top panel 36. The walls 28 and 30 are spaced apart and are substantially parallel to each other.

An elongated member 20 such as a tube or a rod is positioned between the walls 28 and 30. The member 20 is held in position by springs, resilient gaskets, washers, and cotter keys. All of these components are inexpensive and commercially available.

A clamp 90 may be positioned on the member 20 by means of an eye bolt 110 and a nut 116. The clamp 90 can be adjusted so as to be movable on the member 20.

There are two spaced-apart members 20 with clamps 90, one between the exterior and interior wall of the left side 27 of the truck and one between the exterior and interior wall of the right side 31 of the truck.

A stretchable resilient strap 120 with a hook 122 on one end and a hook 124 on the other end may be used and stretched over the cargo box with the hook 122 connecting with eye bolt 110 and the hook 124 connecting with the other eye bolt 110.

If desired, there may be used two resilient stretchable straps 120 spaced apart from each other to hold down the cargo box 126.

SUMMARY OF THE INVENTION

A summary of the invention is as follows:

A tie-down device comprising an elongated member having a first end and a second end; a first positioning means on said first end; a second positioning means on said second end; a first tensioning means to assist in positioning said elongated members; a clamp operatively connecting with said elongated member; an attaching means connecting with said clamp. A tie-down device comprising said first tensioning means being a spring; and said clamp being moveably positioned on said elongated member. A tie-down device comprising said first tensioning means being a compressible resilient member; and said clamp being moveably positioned on said elongated member. A tie-down device comprising said clamp comprising a first leg which extends into a loop; said loop extends into a second leg which overlaps and is spaced apart from said first leg; a first passageway in said first leg; a second passageway in said second leg; said first passageway and said second passageway are aligned; said attaching means having a threaded part; said attaching means being positioned in said first passageway and in said second passageway; part of said attaching means being on the outside of said first leg; part of said threaded part being on the outside of said second leg; a nut on that part of said threaded part outside of said second leg; said elongated member being in said loop; and with the tightening of said nut on said threaded part said first leg and said second leg move toward each to tighten the loop on said elongated member and to fixedly position said clamp on said elongated member.

A process for making a tie-down device and comprising selecting an elongated member having a first end and a second end; positioning a first positioning means on said first end; positioning a second positioning means on said second end; associating a first tensioning with said elongated member to assist in positioning said elongated member; operatively connecting a clamp with said elongated member; and connecting an attaching means to said clamp. A process comprising selecting a spring as said first tensioning means; and moveably positioning said clamp on said elongated member. A process comprising selecting a compressible resilient member as said first tensioning means; and moveably positioning said clamp on said elongated member. A process comprising forming said clamp to comprise a first leg which extends into a loop; extending said loop into a second leg which overlaps and is spaced apart from said first leg; forming a passageway in said first leg; forming a second passageway in said second leg; aligning said first passageway and said second passageway; forming a threaded part on said attaching means; positioning said attaching means in said first passageway and in said second passageway; positioning said attaching means with part of said attaching means being on the outside of said first leg; positioning said attaching means with part of said threaded part being on the outside of said second leg; positioning a nut on that part of said threaded part outside of said second leg; positioning said elongated member in said loop; and tightening said nut on said threaded part to move said first leg and said second leg toward each other to tighten the loop on said elongated member and to fixedly position said clamp on said elongated member.

A tie-down device made by a process comprising selecting an elongated member having a first end and a second end; positioning a first positioning means on said first end; positioning a second positioning means on said second end; associating a first tensioning with said elongated member to assist in positioning said elongated member; operatively connecting a clamp with said elongated member; and connecting an attaching means to said clamp. A tie-down device made by a process comprising selecting a spring as said first tensioning means; and moveably positioning said clamp on said elongated member. A tie-down device made by a process comprising selecting a compressible resilient member as said first tensioning means; and moveably positioning said clamp on said elongated member. A tie-down device made by a process comprising forming said clamp to comprised a first leg which extends into a loop; extending said loop into a second leg which overlaps and is spaced apart from said first leg; forming a passageway in said first leg; forming a second passageway in said second leg; aligning said first passageway and said second passageway; forming a threaded part on said attaching means; positioning said attaching means in said first passageway and in said second passageway; positioning said attaching means with part of said attaching means being on the outside of said first leg; positioning said attaching means with part of said threaded part being on the outside of said second leg; positioning a nut on that part of said threaded part outside of said second leg; positioning said elongated member in said loop; and tightening said nut on said threaded part to move said first leg and said second leg toward each other to tighten the loop on said elongated member and to fixedly position said clamp on said elongated member.

An attaching means comprising a first leg which extends into a loop; said loop extends into a second leg which overlaps and is spaced apart from said first leg; and a first means to vary the distance between said first leg and said second leg to vary the interior dimensions of said loop. An attaching means comprising a first passageway in said first leg; a second passageway in said second leg; said first means comprising a threaded member in said first passageway and in said second passageway; part of said threaded part being on the outside of said second leg; and a nut on said threaded member for varying the distance between the first leg and the second leg. An attaching means comprising said second leg bending into an end which overlaps and is spaced apart from said second leg; said nut being on said threaded member and between said first leg and said second leg; and said first means having connecting means for integrating with an object.

A process for making an attaching means and comprising forming a first leg which extends into a loop; extending said loop into a second leg which overlaps and is spaced apart from said first leg; and associating a first means with said first leg, second leg, and said second leg for varying the distance between said first leg and said second leg to vary the interior dimensions of said loop. A process comprising forming a first passageway in said first leg; forming a second passageway in said second leg; selecting as said first means a threaded member; positioning said threaded member in said first passageway and in said second passageway; positioning part of said threaded member outside of said second leg; and positioning a nut on said threaded member for varying the distance between the first leg and the second leg. A process comprising bending said second leg into an end which overlaps and is spaced apart from said second leg; positioning said nut on said threaded member between said first leg and said second leg; and providing said first means with connecting means for integrating with an object.

An attaching means made by a process comprising forming a first leg which extends into a loop; extending said loop into a second leg which overlaps and is spaced apart from said first leg; and associating a first means with said first leg, second leg, and said second leg for varying the distance between said first leg and said second leg to vary the interior dimensions of said loop. An attaching means made by a process comprising forming a first passageway in said first leg; forming a second passageway in said second leg; selecting as said first means a threaded member; positioning said threaded member in said first passageway and in said second passageway; positioning part of said threaded member outside of said second leg; and positioning a nut on said threaded member for varying the distance between the first leg and the second leg. An attaching means made by a process comprising bending said second leg into an end which overlaps and is spaced apart from said second leg; positioning said nut on said threaded member between said first leg and said second leg; and providing said first means with connecting means for integrating with an object.

A combination of a tie-down device and a bed and comprising said bed having a first side and a second side; said first side and said second side being spaced apart and being substantially parallel; each side comprising an exterior wall, an upper panel, and an inner wall spaced apart from the exterior wall to define an enclosed region; openings in each inner wall for access to said enclosed region; a tie-down device in each enclosed region identified as a first tie-down device and a second tie-down device; said tie-down device comprising and elongated member having a first end and a second end; a first positioning means on said first end; a second positioning means on said second end; a first tensioning means to assist in positioning said elongated member; a clamp operatively connecting with said elongated member; and an attaching means connecting with said clamp. A combination comprising said first tensioning means being a spring; and said clamp being moveably positioned on said elongated member. A combination comprising said first tensioning means being a compressible resilient member; and said clamp being moveably positioned on said elongated member. A combination comprising said clamp comprising a first leg which extends into a loop; said loop extends into a second leg which overlaps and is spaced apart from said first leg; a first passageway in said first leg; a second passageway in said second leg; said first passageway and said second passageway are aligned; said attaching means having a threaded part; said attaching means being positioned in said first passageway and in said second passageway; part of said attaching means being on the outside of said first leg; part of said threaded part being on the outside of said second leg; a nut on that part of said threaded part outside of said second leg; said elongated member being in said loop; and with the tightening of said nut on said threaded part said first leg and said second leg move toward each to tighten the loop on said elongated member and to fixedly position said clamp on said elongated member. A combination comprising a connecting means operatively connecting with said first tie-down device and operatively connecting with said second tie-down device.

A process for making a combination of a tie-down device and a bed and comprising forming said bed to have a first side and a second side; forming said first side and said second side in a spaced-apart, substantially parallel relationship; forming each side to comprise and exterior wall, an upper panel, and an inner wall spaced apart from the exterior wall to define an enclosed region; forming openings in each inner wall for access to enclosed region; positioning a tie-down device in each enclosed region and identified as a first tie-down device and a second tie-down device; in forming said tie-down device, selecting an elongated member having a first end and a second end; positioning a first positioning means on said first end; positioning a second positioning means on said second end; associating a first tensioning with said elongated member to assist in positioning said elongated member; operatively connecting a clamp with said elongated member; and connecting an attaching means to said clamp. A process comprising selecting a spring as said first tensioning means; and moveably positioning said clamp on said elongated member. A process comprising selecting a compressible resilient member as said first tensioning means; and moveably positioning said clamp on said elongated member. A process comprising forming said clamp to comprise a first leg which extends into a loop; extending said loop into a second leg which overlaps and is spaced apart from said first leg; forming a passageway in said first leg; forming a second passageway in said second leg; aligning said first passageway and said second passageway; forming a threaded part on said attaching means; positioning said attaching means in said first passageway and in said second passageway; positioning said attaching means with part of said attaching means being on the outside of said first leg; positioning said attaching means with part of said threaded part being on the outside of said second leg; positioning a nut on that part of said threaded part outside of said second leg; positioning said elongated member in said loop; and tightening said nut on said threaded part to move said first leg and said second leg toward each other to tighten the loop on said elongated member and to fixedly position said clamp on said elongated member. A process comprising operatively attaching a connecting means with said first tie-down device and operatively attaching said connecting means with said second tie-down device.

A combination of a tie-down device and a bed made by a process comprising forming said bed to have a first side and a second side; forming said first side and said second side in a spaced-apart, substantially parallel relationship; forming each side to comprise and exterior wall, an upper panel, and an inner wall spaced apart from the exterior wall to define an enclosed region; forming openings in each inner wall for access to enclosed region; positioning a tie-down device in each enclosed region and identified as a first tie-down device and a second tie-down device; in forming said tie-down device, selecting an elongated member having a first end and a second end; positioning a first positioning means on said first end; positioning a second positioning means on said second end; associating a first tensioning with said elongated member to assist in positioning said elongated member; operatively connecting a clamp with said elongated member; and connecting an attaching means to said clamp. A combination made by a process comprising: selecting a spring as said first tensioning means; and, moveably positioning said clamp on said elongated member. A combination made by a process comprising selecting a compressible resilient member as said first tensioning means; and moveably positioning said clamp on said elongated member. A combination made by a process comprising forming said clamp to comprise a first leg which extends into a loop; extending said loop into a second leg which overlaps and is spaced apart from said first leg; forming a passageway in said first leg; forming a second passageway in said second leg; aligning said first passageway and said second passageway; forming a threaded part on said attaching means; positioning said attaching means in said first passageway and in said second passageway; positioning said attaching means with part of said attaching means being on the outside of said first leg; positioning said attaching means with part of said threaded part being on the outside of said second leg; positioning a nut on that part of said threaded part outside of said second leg; positioning said elongated member in said loop; and tightening said nut on said threaded part to move said first leg and said second leg toward each other to tighten the loop on said elongated member and to fixedly position said clamp on said elongated member. A combination made by a process comprising operatively attaching a connecting means with said first tie-down device and operatively attaching said connecting means with said second tie-down device.

What I claim is:

1. A combination of a tie-down device and a bed and comprising:

a. said bed having a first side and a second side;

b. said first side and said second side being spaced apart and being substantially parallel;

c. each side comprising an exterior wall, an upper panel, and an inner wall spaced apart from the exterior wall to define an enclosed region;

d. openings in each inner wall for access to said enclosed region;

e. a tie-down device in each enclosed region identified as a first tie-down device and a second tie-down device;

f. said first tie-down device comprising an elongated member having a first end and a second end;

g. a first positioning means on said first end;

h. a second positioning means on said second end;

i. a first tensioning means to assist in positioning said elongated member;

j. a clamp operatively connecting with said elongated member; and, k. an attaching means connecting with said clamp.

2. A combination according to claim 1 and comprising:

a. said first tensioning means being a spring; and, b. said clamp being moveably positioned on said elongated member.

3. A combination according to claim 1 and comprising:

a. said first tensioning means being a compressible resilient member; and, b. said clamp being moveably positioned on said elongated member.

4. A combination according to claim 1 and comprising:

a. said clamp comprising a first leg which extends into a loop;

b. said loop extends into a second leg which overlaps and is spaced apart from said first leg;

c. a first passageway in said first leg;

d. a second passageway in said second leg;

e. said first passageway and said second passageway are aligned;

f. said attaching means having a threaded part;

g. said attaching means being positioned in said first passageway and in said second passageway;

h. part of said attaching means being on the outside of said first leg;

i. part of said threaded part being on the outside of said second leg;

j. a nut on that part of said threaded part outside of said second leg;

k. said elongated member being in said loop; and, l. with the tightening of said nut on said threaded part said first leg and said second leg move toward each to tighten the loop on said elongated member and to fixedly position said clamp on said elongated member.

5. A combination according to claim 4 and comprising:

a. a connecting means operatively connecting with said first tie-down device and operatively connecting with said second tie-down device.

6. A process for making a combination of a tie-down device and a bed and comprising:

a. forming said bed to have a first side and a second side;

b. forming said first side and said second side in a spaced-apart, substantially parallel relationship;

c. forming each side to comprise an exterior wall, an upper panel, and an inner wall spaced apart from the exterior wall to define an enclosed region;

d. forming openings in each inner wall for access to said enclosed region;

e. positioning a tie-down device in each enclosed region and identified as a first tie-down device and a second tie-down device;

f. in forming each said tie-down device, selecting an elongated member having a first end and a second end;

g. positioning a first positioning means on said first end;

h. positioning a second positioning means on said second end;

i. associating a first tensioning means with said elongated member to assist in positioning said elongated member;

j. operatively connecting a clamp with said elongated member; and, k. connecting an attaching means to said clamp.

7. A process according to claim 6 and comprising:

a. selecting a spring as said first tensioning means; and, b. moveably positioning said clamp on said elongated member.

8. A process according to claim 6 and comprising:

a. selecting a compressible resilient member as said first tensioning means; and, b. moveably positioning said clamp on said elongated member.

9. A process according to claim 6 and comprising:

a. forming said clamp to comprise a first leg which extends into a loop;

b. extending said loop into a second leg which overlaps and is spaced apart from said first leg;

c. forming a passageway in said first leg;

d. forming a second passageway in said second leg;

e. aligning said first passageway and said second passageway;

f. forming a threaded part on said attaching means;

g. positioning said attaching means in said first passageway and in said second passageway;

h. positioning said attaching means with part of said attaching means being on the outside of said first leg;

i. positioning said attaching means with part of said threaded part being on the outside of said second leg;

j. positioning a nut on that part of said threaded part outside of said second leg;

k. positioning said elongated member in said loop; and, l. tightening said nut on said threaded part to move said first leg and said second leg toward each other to tighten the loop on said elongated member and to fixedly position said clamp on said elongated member.

10. A process according to claim 9 and comprising:

a. operatively attaching a connecting means with said first tie-down device and operatively attaching said connecting means with said second tie-down device.

* * * * *